United States Patent
Ogata

[15] 3,699,204
[45] Oct. 17, 1972

[54] METHOD FOR MAKING FIN-FREE MUTLI-BORED RUBBER SHEETS

[72] Inventor: Nobuo Ogata, Kamakura, Japan

[73] Assignee: Bridgestone Tire Company Limited, Tokyo, Japan

[22] Filed: May 18, 1971

[21] Appl. No.: 144,443

[30] Foreign Application Priority Data

May 21, 1970 Japan..................45/42909

[52] U.S. Cl..............264/154, 264/161, 264/316
[51] Int. Cl..............................................B29c 17/12
[58] Field of Search.............264/161, 154, 316

[56] References Cited

UNITED STATES PATENTS

| | | |
|---|---|---|
| 1,911,765 | 5/1933 | Matthews et al. .........264/161 |
| 2,072,349 | 3/1937 | Wayne...................264/161 X |
| 2,689,379 | 9/1954 | Nissel.......................264/154 |
| 2,712,159 | 7/1955 | Marsch......................264/316 |
| 2,962,764 | 12/1960 | Trojanowski et al. ..264/316 X |
| 3,557,276 | 1/1971 | Williams...................264/316 |

Primary Examiner—Robert F. White
Assistant Examiner—Allen M. Sokal
Attorney—Stevens, Davis, Miller & Mosher

[57] ABSTRACT

A method for making fin-free multi-bored rubber sheets by pressing a starting raw-rubber sheet against a die having a plurality of die projections. A carrier sheet, which can integrally adhere to those portions of the starting rubber sheet which are strongly pressed thereto by the free ends of the die projections, is overlaid on the starting raw-rubber sheet prior to the pressing. Thereby, upon completion of the pressing operation, the carrier sheet is separated from the starting rubber sheet, for ensuring the complete elimination of the fins at the bored portions of the rubber sheet.

4 Claims, 12 Drawing Figures

INVENTOR

BY

ATTORNEY

METHOD FOR MAKING FIN-FREE MUTLI-BORED RUBBER SHEETS

This invention relates to a method for making fin-free multi-bored rubber sheets, and more particularly to a simple and inexpensive method for making multi-bored rubber sheets whose bores are cleanly formed in a fin-free manner with accurate diametrical and positional dimensions.

The use of multi-bored rubber sheets has recently been expanded, for instance, as vibrating sifting screens, because such multi-bored rubber sheets do not produce any annoying noise.

The dimensions of holes in such multi-bored rubber sheets, inclusive of the hole diameters as well as spacing therebetween, must be accurate, from the standpoint of service life, especially in the case of vibrating sifting screens.

According to a conventional process for making such multi-bored rubber sheets, a shaping press is used, which includes a surface plate for receiving a die having a plurality of die projections $f$ formed thereon. A pressure board having a flat surface cooperates with such shaping press. A starting raw-rubber sheet is placed on the surface plate of the shaping press, and then the pressure board presses the starting raw-rubber sheet to produce the desired multi-bored rubber sheet $s$ having holes $h$ bored therethrough. With such known process, the rubber sheet being shaped can be vulcanized immediately after the shaping, simply by heating the shaping press and the pressure board. In the space between the pressure board and the free end surfaces of the die projections, the raw rubber material tends to flow toward the periphery of the holes $h$ of the sheet $s$. It is, however, inevitable that a part of the raw-rubber material remains in the aforesaid space between the pressure board and the die projection, and such residual raw-rubber material becomes fins $p$ at the edges of holes $h$ in the finished sheet $s$.

In order to remove such fins, it has been practised to manually clear each of such holes $h$ by a punch $r$ having an annular cutting edge $e$, or to mechanically clear the fins by using a lower die board $l$ having a plurality of the punches $r$ in conjunction with a cooperating upper die board $u$. The manual process is and expensive, while the latter mechanical process has a difficulty in that the locations of the clearing punches $r$ on the lower die board are hard to align with the desired hole positions of the rubber sheet $s$. Especially, when the size of the holes $h$ is small, the alignment of the punches $r$ with the desired holes $h$ is difficult to establish. If the punches $r$ are not accurately aligned with the desired holes $h$, the round cutting edges $e$ of the punches $r$ tend to deform the shape of the individual holes $h$, and hence, the uniformity of the hole size is likely to be lost.

The deformation of the individual holes $h$ in the fin-removing operation may be avoided by using punches $r$ each having an annular cutting edge $e$ whose outer diameter being smaller than the desired inner diameter of the hole $h$. In this case, it is difficult to clearly remove the fins $p$.

It has also been proposed to use a plurality of die recesses $c$ integrally formed with the shaping surface of a pressure board $d$ coacting with a shaping press having a surface plate with a plurality of die projections $f$. The die recesses $c$ are aligned with the die projections $f$, respectively. The cooperation of the die projections $f$ and the die recesses $c$ results in the formation of a plurality of fins $p''$ which are offset from the surface of the sheet $s$. The fins $p''$ thus offset from the surface of the sheet $s$ can comparatively easily be cleared by simple buffing or the like. The pressure board $d$ with such die recesses $c$ in accurate alignment with the die projections $f$ is difficult to make, and hence, it is very expensive. In addition, for achieving satisfactory results, careful and tedious maintenance work is necessary on the pressure board $d$.

Therefore, an object of the present invention is to obviate the aforesaid difficulties of known processes of making multi-bored rubber sheets, by providing an improved method for making fin-free multi-bored rubber sheets. With the method according to the present invention, a rubber sheet having a plurality of fin-free holes bored therethrough with accurate dimensions of the size and position can be obtained, without necessitating any complicated finishing work or elaborate dies.

To fulfill the aforesaid object, the present invention uses a carrier sheet to be overlaid on a starting raw-rubber sheet. The starting raw-rubber sheet is laid on a die mounted on the surface plate of a shaping press, while directing the carrier sheet overlaid thereon toward a cooperating pressure board. When the pressure board is forced toward the surface plate of the shaping press, die projections formed on the die at the surface plate act to form desired holes on the starting raw-rubber sheet and to press resultant fins toward the carrier sheet. Upon completion of the shaping operation, the pressure board is separated from the shaping press and the carrier sheet is removed from the multi-bored rubber sheet thus formed. The carrier sheet is such that the fins which are pressed to the carrier sheet during the shaping operation are separated from the multi-bored rubber sheet, as the carrier sheet is removed from the multi-bored rubber sheet.

The carrier sheet to be used in the method of the present invention is required to ensure the smooth flow of raw-rubber material during the shaping operation, to withstand the pressure applied thereto during the shaping operation, and to be joined to those portions of the starting raw-rubber sheet which are pressed thereto by the die projections at a pressure higher than a predetermined level. Such carrier sheet to be selectively joined to the starting raw-rubber sheet is, for instance, a woven cloth, a sheet of toughened paper, a rubber sheet, a plastics sheet, or a metallic sheet, all of which is specially treated so as to meet the aforesaid conditions required for the carrier sheet. The aforesaid selective joining of the carrier sheet to the starting raw-rubber sheet may be effected by twining the raw-rubber material to the texture of the woven cloth, or by any other mechanism suitable for meeting the aforesaid conditions.

The separation of the carrier sheet from the shaped multi-bored rubber sheet should preferably be carried 'ut while the latter is still warm before the multi-bored sheet is completely cooled, so that the fins formed during the shaping operation can easily be separated from the rubber sheet without causing any significant scars thereon. When the rubber sheet is still warm, the rubber sheet is comparatively soft and the fins are easily separable from the sheet.

For a better understanding of the invention, reference is made to the accompanying drawings, in which.

Like parts are designated by like numerals and symbols throughout the drawings.

Figure 7:
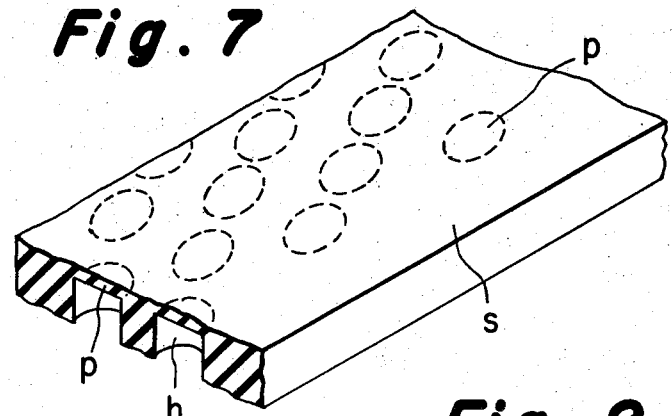
FIG. 7 is a partial perspective view of a rubber sheet as formed by a conventional device for making multi-bored rubber sheet.
Figure 8:
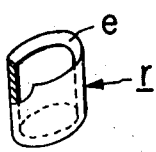
FIGS. 8 and 9 are schematic perspective views, illustrating a punch for removing fins and a press using a plurality of such punches, respectively.
Figure 9:
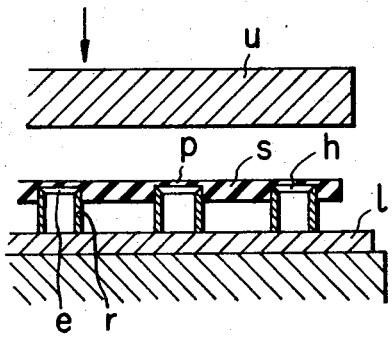

Referring to FIGS. 7 to 9, a multi-bored rubber sheet $s$ made by a known process includes fins $p$ formed at one end of each hole $h$ thereof. In order to remove such fins $p$, one or more punches $r$, each having an annular edge $e$ have heretofore been used. Manual removal by using only one such punch $r$ is time-consuming, and not practical on industrial scale. A plurality of such punches $r$ may be secured to a lower die board $l$ in alignment with the holes $h$ of the sheet $s$ as shown in FIG. 9. If such punches are fitted in the holes $h$ of the sheet $s$ and the sheet $s$ is pressed toward the punches $r$ by an upper board $u$, the fins $p$ of different holes $h$ may be removed simultaneously in one stroke. To successfully carry out such simultaneous removal of the fins $p$, the punches $r$ must be accurately aligned with the holes $h$ in the sheet $s$. If the punches are not aligned, the holes $h$ may be deformed by being cut by such punches, and it becomes impossible to produce accurately dimensioned multi-bored rubber sheets. Anyone experienced in the art knows that such accurate alignment of the punches $r$ with the desired holes $h$ is rather difficult to achieve.

Figure 10:
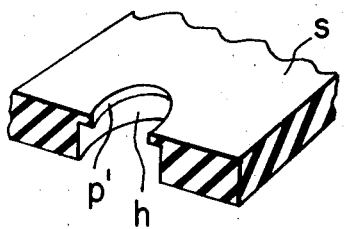
FIG. 10 is a schematic partial perspective view of a defective multi-bored rubber sheet caused by using an improper fin-removing punch.

If the outer diameter of the annular edge $e$ of the punch $r$ is smaller than the inner diameter of the hole $h$ in the sheet $s$, a small annular fin $p'$ is left at one end of the hole $h$, as shown in FIG. 10. Such small fins $p'$ are highly harmful to the accurate sifting operation.

Figure 11:
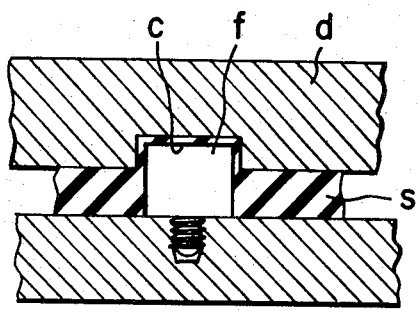
FIGS. 11 and 12 are diagrammatic illustrations of another known process for making multi-bored rubber sheets.
Figure 12:
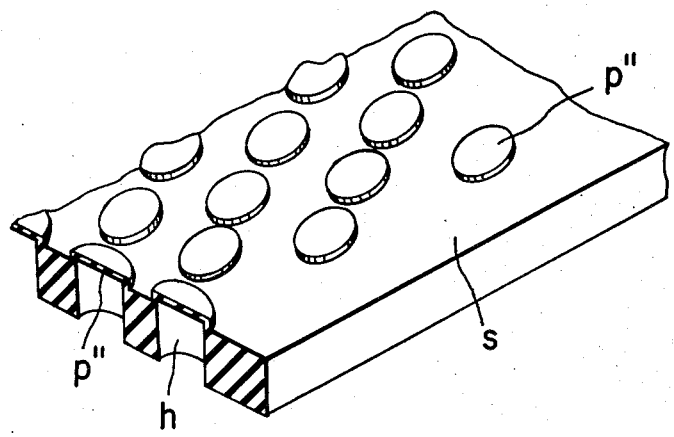

It has been practised to use a second die $d$ having recesses $c$ for receiving die projections $f$, as shown in FIG. 11. With such second die $d$, the fins $p''$ are offset from the surface of the desired multi-bored rubber sheet $s$, as shown in FIG. 12. The offsetting of the fins from the rubber sheet surface facilitates the removal of the fins, for instance, by simple buffing. It is, however, difficult and time-consuming to form the recesses $c$ of the second die $d$ in accurate alignment with the die projections $f$. If the recesses $c$ are not exactly aligned with the die projections $f$, the desired result cannot be achieved.

Therefore, the essential object of the present invention is to mitigate the aforesaid difficulties of the known processes for making multi-bored rubber sheets, by providing an improved method for making fin-free multi-bored rubber sheets.

Figure 1:
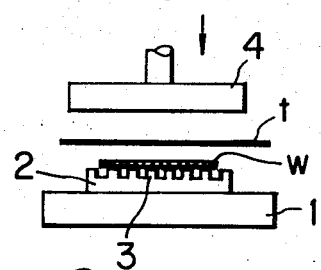
FIGS. 1 and 2 are schematic diagrams, illustrating the conditions of a shaping press before and after the shaping operation, according to the method of the present invention.

FIG. 1 illustrates a shaping press and a pressure board which can be used in the method for making fin-free multi-bored rubber sheets, according to the present invention. A surface plate 1 of shaping press carries a die 2 placed thereon. The die 2 includes a plurality of die projections 3 for shaping desired holes in the rubber sheet. The die projections 3 in FIG. 1 correspond to die projections $f$ of the aforesaid conventional devices. A pressure board 4 has a surface which move toward and away from a plane of the free ends of the die projections 3, in parallel with latter plane. The assembly of the shaping press inclusive of the surface plate 1 and the pressure board 4 is of known construction, and can be actuated by a conventional driving means. The surface plate 1 and the pressure board 4 can also be used for the purpose of vulcanization, in a manner well known to those skilled in the art.

Figure 2:
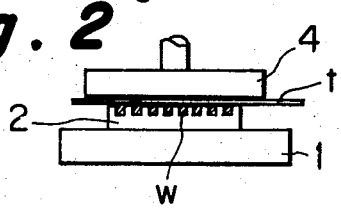

A starting raw-rubber sheet $w$ is placed on the die projections 3 of the die 2. A carrier sheet $t$, such as a woven cloth, is spread on the upper surface of the starting raw-rubber sheet $w$. Then, the pressure board 4 is lowered by a suitable known means, such as a conventional hydraulic drive, so that the starting raw-rubber sheet $w$ and the carrier sheet $t$ are pressed against the die 2, as shown in FIG. 2. Under such conditions, the die projections 3 penetrate through the raw-rubber sheet $w$ for shaping the desired holes $h$ of the multi-bored rubber sheet.

Figure 3:
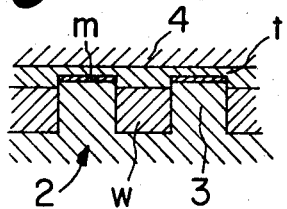
FIG. 3 is a partial enlarged sectional view of the shaping press illustrated in FIG. 2.

Referring to FIG. 3, according to the present invention, the upper end of each die projection 3 strongly urges the corresponding part of the raw-rubber sheet $w$ to the pressure board 4 through the carrier sheet $t$ inserted therebetween. Although the starting raw-rubber sheet material at the part facing the upper end of the die projection 3 mostly flows to the periphery of the hole formed through the sheet $w$, it is inevitable that a small portion of such raw-rubber material is left from the aforesaid flow so as to form a thin layer $m$, which is pressed into the texture of the carrier sheet $t$. Consequently the thin layer $m$ is joined to the carrier sheet $t$.

If it is desired to have a very strong joint between the carrier sheet $t$ and the aforesaid thin layer $m$, an additional thin rubber sheet or a thin rubber lining may be applied on that surface of the carrier sheet $t$ which contacts the pressure board 4, so that the aforesaid thin layer $m$ may be communicated and joined to such additional thin rubber sheet through the carrier sheet $t$.

Figure 4:
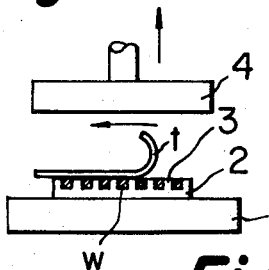
FIG. 4 is a diagrammatic illustration of the manner in which the fins are removed.
Figure 5:
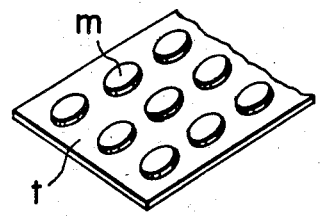
FIG. 5 is a schematic perspective view of a carrier sheet carrying a plurality of fins joined thereto.

The multi-bored rubber sheet thus formed should preferably be vulcanized before removing the pressure board 4 from the surface plate 1 of the shaping press. Upon completion of the vulcanization, the pressure board 4 is raised, e.g., by a hydraulic means, so as to allow the removal of the carrier sheet $t$ from the die 2, as shown in FIG. 4. When the carrier sheet $t$ leaves the die 2, the aforesaid thin layers $m$ are removed together with the carrier sheet $t$, as shown in FIG. 5. Thereby, the starting raw-rubber sheet w is shaped into a fin-free multi-bored rubber sheet s, as shown in FIG. 6.

Figure 6:
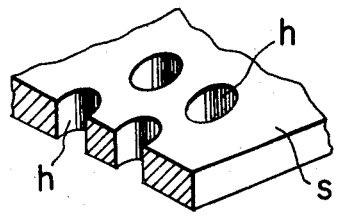
FIG. 6 is a partial perspective view of a fin-free multi-bored rubber sheet, which is obtainable by the method according to the present invention.

More particularly, each hole h in the multi-bored rubber sheet s made by a method according to the present invention has a clean and smooth edge, as can be seen from FIG. 6. Besides, the locations of the holes h can be accurately established by means of the die 2 having the die projections 3 integrally formed therewith in a precise fashion. It is an important feature of the present invention that the desired fin-free multi-bored rubber sheet having clean holes, which are accurately disposed at predetermined intervals, can be produced by one simple process of pressing followed by vulcanization in the state as pressed.

When a woven cloth is used as the carrier sheet t, the texture of the woven cloth may be transferred to the surface of the fin-free multi-bored rubber sheet s. Such texture, however, is not harmful at all if the multi-bored rubber sheet s is used as a sifting screen. If such texture is not desirable, it can easily be removed from the surface of the multi-bored rubber sheets s by simple buffing. If the carrier sheet t has a smooth surface facing the multi-bored rubber sheet s, the surface of the multi-bored rubber sheet s is, of course, made smooth without any undesirable patterns thereon.

As described in the foregoing disclosure, the present invention provides an improved method for making fin-free multi-bored rubber sheets having clear smooth holes of accurate dimensions with respect to the inside diameter and mutual locations thereof, simply by inserting a carrier sheet between a starting raw-rubber sheet and a pressure board for pressing the starting raw-rubber sheet to a shaping die. The method according to the present invention does not cause any significant complication in the shaping operation and does not use any elaborately shaped dies.

Thus, the present invention contributes greatly to the industry.

What is claimed is:

1. A method for making fin-free multi-bored rubber sheets, comprising steps of disposing a die having a plurality of die projections on the surface plate of a shaping press, spreading a starting raw-rubber sheet on a plane of the free ends of the die projections, overlaying a carrier sheet on the starting raw-rubber sheet, pressing the starting raw-rubber sheet together with the carrier sheet toward the die by means of a flat pressure board, said carrier sheet being of such material and construction that when those parts of the raw-rubber sheet which face the free ends of the die projections are pressed against the carrier sheet by a pressure in excess of a certain value said parts of the raw-rubber sheet are joined to the carrier sheet, moving said pressure board away from the die, removing the carrier sheet from the raw-rubber sheet together with the said portions facing the free ends of the die projections, and removing the rubber sheet from the die.

2. A method for making fin-free multi-bored rubber sheets, comprising steps of disposing a die having a plurality of die projections on the surface plate of a shaping press, spreading a starting raw-rubber sheet on a plane of the free ends of the die projections, overlaying a carrier sheet on the starting raw-rubber sheet, overlaying another layer of thin rubber on said carrier sheet, pressing the starting raw-rubber sheet together with the carrier sheet toward the die by means of a flat pressure board, said carrier sheet being of such material and construction that when those parts of the raw-rubber sheet which face the free ends of the die projections are pressed against the carrier sheet by a pressure in excess of a certain value said parts of the raw-rubber sheet are joined to the carrier sheet as well as to said thin rubber layer through the carrier sheet, moving said pressure board away from the die, removing the carrier sheet from the raw-rubber sheet together with the portions facing the free ends of the die projections, and removing the rubber sheet from the die.

3. A method according to claim 1 and further comprising a step of vulcanizing the rubber sheet by heating said die and said pressure board after said pressing prior to moving said pressure board.

4. A method according to claim 1, wherein said carrier sheet is made of material selected from the group consisting of a woven cloth, a sheet of toughened paper, a rubber sheet, a plastics sheet, and a metallic sheet.

* * * * *